United States Patent [19]

Day

[11] Patent Number: 5,340,202
[45] Date of Patent: Aug. 23, 1994

[54] SERVICE BRAKING TECHNIQUE FOR MATERIAL HANDLING VEHICLES

[75] Inventor: Richard M. Day, Binghamtpon, N.Y.
[73] Assignee: Raymond Corporation, Greene, N.Y.
[21] Appl. No.: 968,777
[22] Filed: Oct. 30, 1992

Related U.S. Application Data

[63] Continuation-in-part of Ser. No. 785,954, Oct. 30, 1991, abandoned.

[51] Int. Cl.$^5$ .............................................. B60T 7/14
[52] U.S. Cl. ..................................... 303/19; 318/373; 318/376
[58] Field of Search ............... 318/371, 373, 376, 377; 303/3, 19

[56] References Cited

U.S. PATENT DOCUMENTS

| | | | |
|---|---|---|---|
| 4,074,176 | 2/1978 | Parke et al. | 318/371 |
| 4,417,288 | 11/1983 | Hattori et al. | 318/371 X |
| 4,518,902 | 5/1985 | Melocik et al. | 318/373 |
| 4,651,071 | 3/1987 | Imanaka | 303/3 X |

Primary Examiner—Robert J. Oberleitner
Assistant Examiner—Lee W. Young
Attorney, Agent, or Firm—Salzman & Levy

[57] ABSTRACT

The present invention features an improved technique for slowing and stopping a vehicle having an electric service motor, a mechanical parking brake, and a deadman's switch for engaging the mechanical brake. The method of the invention improves the efficiency of the braking procedure. The braking method initially determines if the deadman's switch is engaged. If it is, then the electric service motor is plugged at a predetermined minimum plug rate until the vehicle slows to a specified velocity. When the specified velocity is reached, the plugging operation is terminated. The mechanical brake is then engaged to slow the vehicle to a halt. When the vehicle comes to a halt, the parking brake remains engaged. The invention also improves safety by increasing the controlled rate of plugging to a maximum value in the event that the deadman's switch is off. Actual braking performance by plugging is compared with that of accepted rates of deceleration or plugging effort shown by armature current to verify operation of the service braking system. In the event of inadequate service braking, such braking is terminated and the mechanical brake is applied.

27 Claims, 13 Drawing Sheets

SERVICE BRAKING TECHNIQUE FOR MATERIAL HANDLING VEHICLES

This is a continuation-in-part of copending application(s) Ser. No. 07/785,954 filed on Oct. 30, 1991, now abandoned.

BACKGROUND OF THE INVENTION

The present invention relates to material handling vehicles and, more particularly, to a technique for slowing and stopping material handling vehicles by using an efficient plugging technique, and one which provides safety by monitoring braking performance.

Mechanical brakes are conventionally used to slow and stop material handling vehicles, such as forklift trucks. The brakes can be used for service, for parking, and/or for emergency braking. Braking is accomplished by means of a mechanical or mechanical/hydraulic linkage coupling between the deadman's pedal and the brake. Braking is generally variable and proportional to the distance that the deadman's pedal is lifted.

When the electric traction motor itself is used to slow the vehicle, however, a technique called "plugging" is most often used. Plugging is accomplished when the operator moves the speed control mechanism such that power is applied to the motor tending to drive the motor in a direction opposite to that in which the vehicle is moving, although the motor still rotates in the forward direction. The motor operates, in both the plugging and driving modes, by the operator actuating the control handle, which generates both positive and negative torques. Until the vehicle slows to zero speed, the motor acts as a dynamic brake. Ultimately, the vehicle slows to a stop and begins to move in the reverse direction, at which time the plugging action ceases. It should be noted that plugging, as herein defined, may utilize the principle of dynamic braking as well as a combination of regenerative and dynamic braking.

The present invention seeks to improve the aforesaid braking effort by achieving consistent and predictable (factory programmable) braking. In this way, the wear of the mechanical brake is reduced, thus extending its operating life, while reducing the need for repeated, frequent servicing. The mechanical brake is used for parking purposes only and as a backup to the motor braking. Also, since non-variable ON-OFF brakes are less expensive than are variable type brakes, overall costs are reduced.

The traction motor is used not only for driving the vehicle, but for plug braking and for service braking. In service braking, the operator initiates negative torque in the motor by releasing the deadman's pedal or switch. An electrical mechanism (specifically, plugging) is provided for coupling between the deadman's pedal and the control system to generate negative torque. The service braking effort cannot be altered by the user in the present invention, since it is intended to bring the vehicle to a full stop within applicable safety standards.

The inventive procedure improves the braking effort by terminating plugging at or near zero velocity, and only then engages the mechanical brake. The system programs the braking action to cut-in the mechanical brake system at the optimum time. Efficiency is enhanced also by slowing the vehicle at a predetermined plug rate.

The invention improves safety by interrupting the controlled rate of plugging in the event that the deadman's switch is thrown. In such a case, the rate of deceleration is increased to provide service braking. Safety is further ensured by detecting if service braking is actually occurring. If it is not, the mechanical parking brake, which is normally used only for parking, could be engaged as an emergency brake to stop the vehicle when the motor fails to brake.

Service braking requires the proper operation of many components such as the deadman's pedal switches, the microprocessor control system, the field drive circuits, the free-wheeling diode circuit, and the motor itself. Each of these components could be tested individually by a properly designed control system. However, a failure situation must be detected as soon as possible. Since all possible failure modes must be tested for this system to be effective, individual testing of all of these components would place an undue burden on the control system and/or limit its ability to react quickly.

Alternatively, it would be advantageous to provide a means to determine whether service braking is actually occurring by observing the end results.

It would also be advantageous to detect service braking by more than one method to provide redundancy. For this reason, two different methods of detecting plugging during service braking are described herein. The first method involves measuring the deceleration of the vehicle; the second involves measuring the electrical current in the drive motor armature during plugging. Testing armature current in order to detect plugging is especially effective because the amount of current is a direct indication of the effort exerted by the motor and its anticipated deceleration. These tests Call be run concurrently to provide a high level of reliability.

It would also be advantageous to use the same sensing elements as the main control system in the tests of plugging in order to reduce costs and to provide a means of cross-checking operation.

It would also be advantageous to provide a plugging detection system capable of reacting as quickly as possible to a failure of service braking.

U.S. Pat. No. 4,518,902 issued to Melocik et al discloses the conventional plugging technique described above. The Melocik reference teaches the use of a circuit for controlling the direction of motor energization, a circuit for generating digital numbers representing motor speeds, a circuit for generating a data signal representing a plugging condition, a programmable processor for generating pulse trains, and a power transistor for coupling power to the motor in response to the pulse trains. This patented system pulses the motor at a preselected plugging rate by means of a feedback control. Plugging continues until the vehicle is stopped.

U.S. Pat. No. 4,265,337 issued to Dammeyer discloses a speed control circuit for a lift truck driven by an electric truck drive motor. A motor controller initiates the plugging technique. The Dammeyer reference requires two switches to actuate motor plugging. Moreover, when the vehicle stops, the motor continues in the reverse direction, which can cause the truck to move in a reverse direction.

It would be advantageous to provide an improved system for slowing and stopping a vehicle by means of its service motor in order to reduce the cost and wear on the mechanical brake.

It would also be advantageous to automatically engage the motor braking technique when the deadman's switch is released.

It would also be advantageous to terminate service braking if the deadman's pedal is engaged.

It would also be advantageous to sense when the vehicle is slowing down to a predetermined rate of speed and then to disengage the motor, so that the mechanical brake can be engaged and, eventually, used as a parking brake.

It would also be advantageous to programmably control deceleration of the vehicle.

SUMMARY OF THE INVENTION

In accordance with the present invention, an improved technique is provided for slowing and stopping a vehicle having an electric service motor, a mechanical parking brake and a deadman's pedal or switch. The method of the invention improves the efficiency of the braking procedure. The braking method initially determines if the deadman's pedal is released and the deadman's switch is off. If it is, then the electric service motor is plugged at a predetermined plug rate until the vehicle slows to a specified velocity. When the specified velocity is reached, the plugging operation is terminated. The mechanical brake is then engaged to slow the vehicle to a complete stop. When the vehicle comes to a halt, the parking brake remains engaged. The invention also improves safety by monitoring the controlled rate of service braking. In the event that the braking is not performing adequately, the rate of deceleration is increased by engaging the mechanical brake system to provide emergency stopping. Safety is further improved by plugging in a controlled manner with minimum predetermined levels, even when the speed control mechanism is in neutral. This provides consistent plugging performance under varying conditions and between different vehicles.

BRIEF DESCRIPTION OF THE DRAWINGS

A complete understanding of the present invention may be obtained by reference to the accompanying drawings, when taken in conjunction with the detailed description thereof and in which:

FIG. 3 shows the arrangement of FIGS. 3a and 3b.

DESCRIPTION OF THE PREFERRED EMBODIMENT

Figure 1:
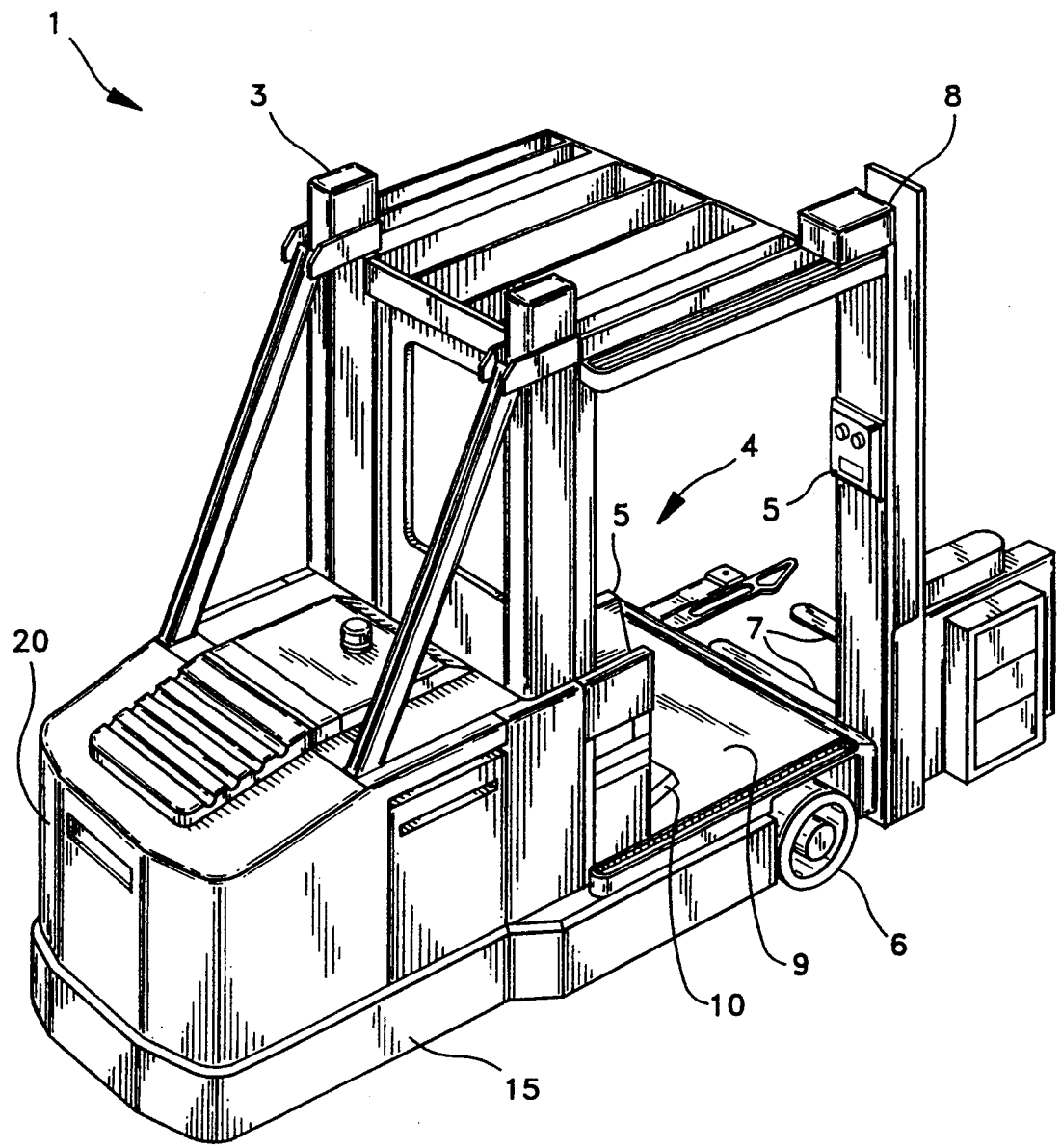
FIG. 1 is a perspective view of a material handling vehicle incorporating the service braking technique of the present invention.

Referring now to FIG. 1, there is shown a perspective view of a material handling vehicle 1, the preferred embodiment being referred to as a lift truck. Vehicle 1 comprises a tractor frame 15, to which are mounted the major operating components of the vehicle 1, such as a main telescoping mast 3, to which is connected an elevating platform 9, an operator control station 4 with a deadman's pedal 10 and suitable displays 5, two non-steerable wheels 6, forks 7, and an auxiliary mast 8. A steering and drive system 20 is disposed at the rear of the vehicle 1 operatively connected to tractor frame 15 beneath a traction motor (not shown).

Figure 2:
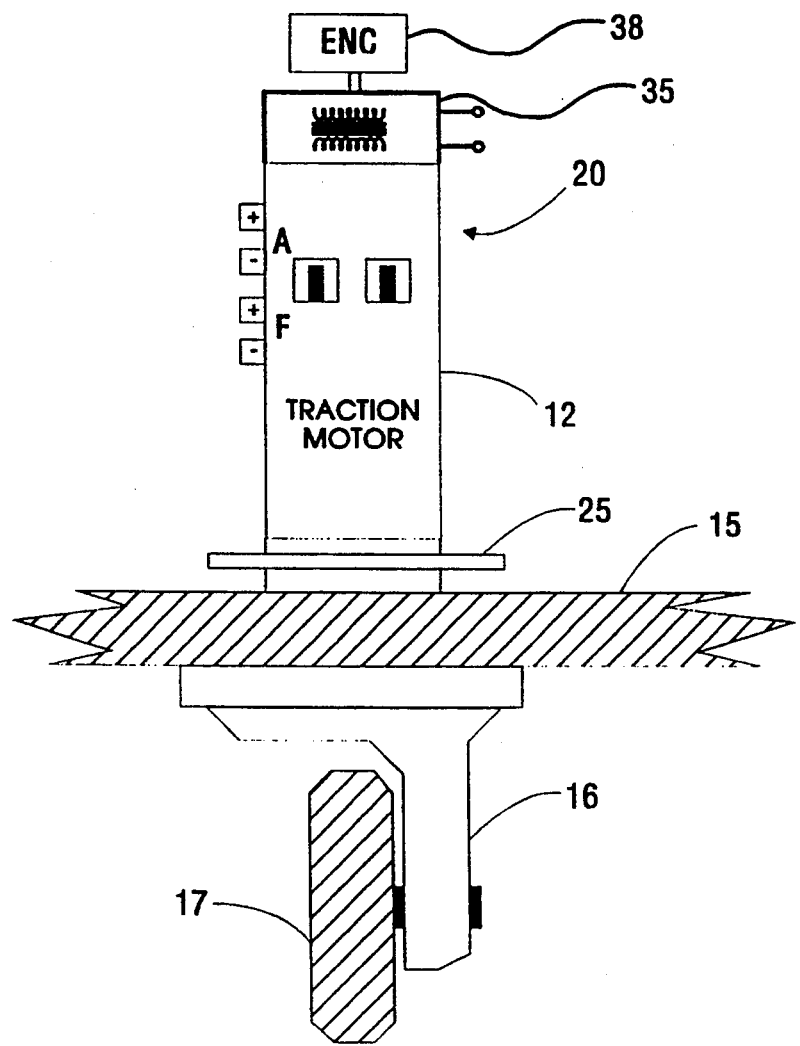
FIG. 2 is a block diagram of a traction motor with controls in accordance with the present invention.

Referring now to FIG. 2, a conventional lift truck drive system is shown generally at reference numeral 20. The drive system 20 features a traction motor 12.

The material handling truck has a single, combination steering and drive wheel 17 that is driven by the traction motor 12 via an internal drive shaft (not shown). The internal drive shaft engages the steering and drive unit 16, which comprises a transmission that adapts the speed of the wheel 17 to that of the traction motor 12. The traction motor 12 and steering and drive unit 16 are attached and integrally mounted on the material handling truck frame 15.

A travel speed sensor or encoder 38 is mounted upon the traction motor 12 for detecting the speed thereof. Also mounted in operative relationship to motor 12 and steering and drive unit 16 is an electromechanical, non-variable ON-OFF brake 35, the operation of which is described hereinbelow. A master gear or steer ring 25, disposed between motor 12 and steering and drive unit 16, is connected to a steer motor (not shown) by appropriate mechanical linkages.

Figure 3A:
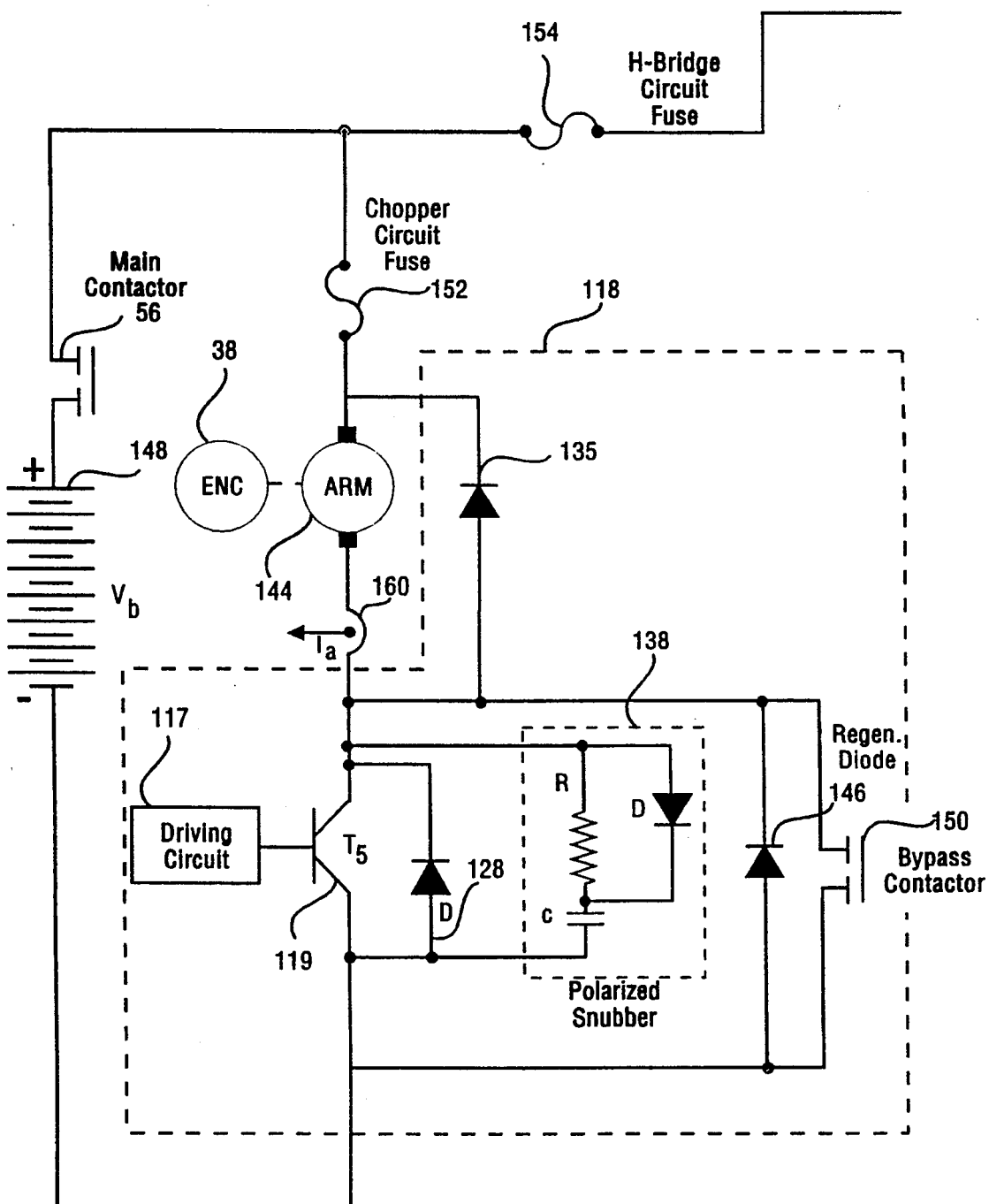
FIGS. 3a and 3b, taken together, represent an electrical schematic diagram of the motor control circuit of the present invention.
Figure 3B:
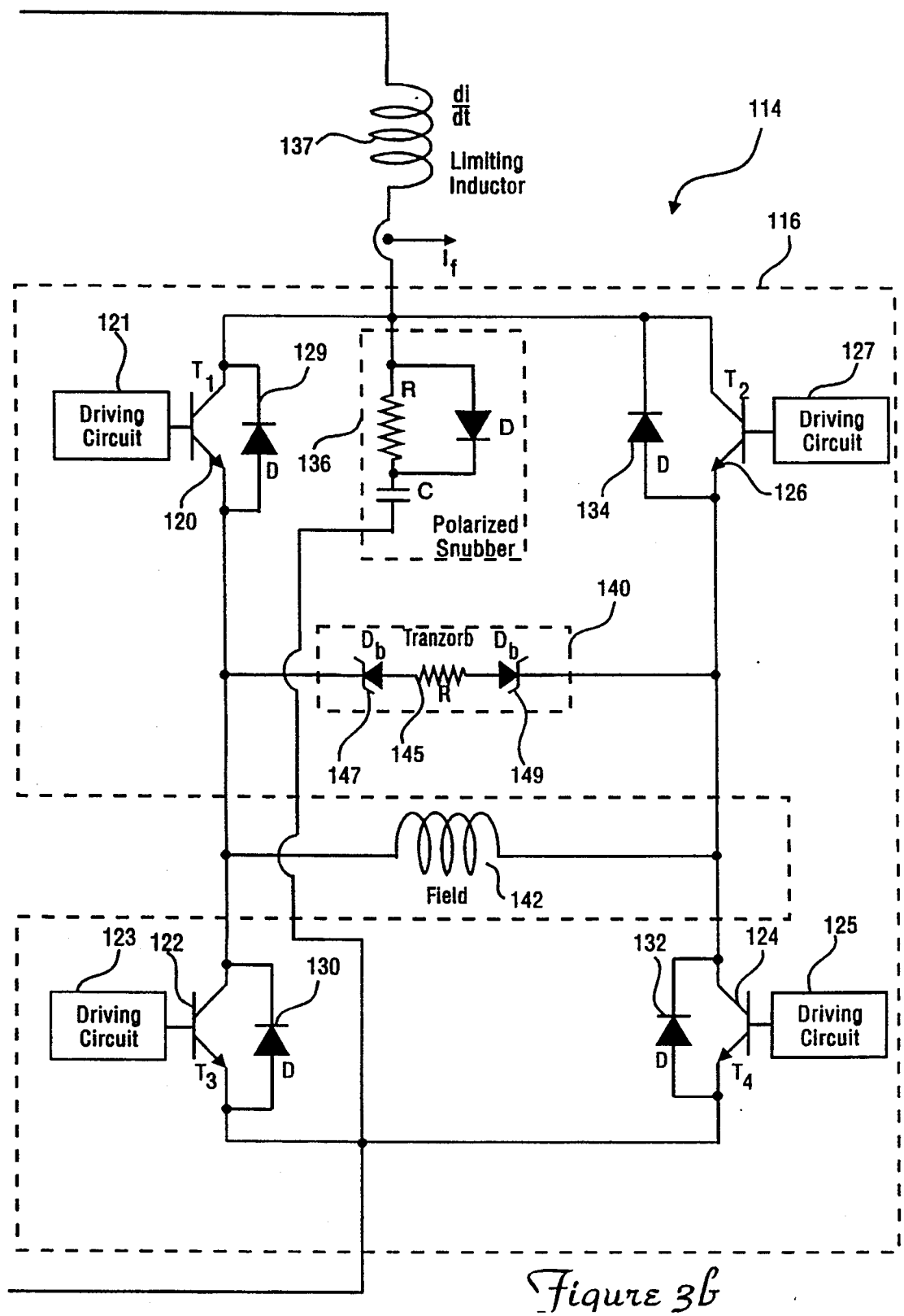

Referring now also to FIGS. 3a and 3b, there is shown a schematic diagram of a dc motor control circuit, shown generally as reference numeral 114, which provides independent control of a series- or shunt-wound dc motor by independently controlling its armature winding 144 and field winding 142. A load (not shown) is driven by the armature 144.

A suitable means for providing a feedback signal proportional to the motor rotational speed is indicated by encoder 38, which is connected to armature 144. It will, of course, be obvious to those skilled in the art that encoder 38 is merely exemplary and that other devices or methods can be employed to perform the same speed sensing function.

The primary components of motor control circuit 114 are a chopper circuit 118 which controls armature winding 144 and an H-bridge circuit 116 which controls field winding 142. Two pairs of transistors 120, 122 and 124, 126 are connected to field winding 142, as shown.

Power is supplied to motor control circuit 114 by a dc battery 148. A main power contactor 156 is connected to battery 148 and chopper circuit 118 and H-bridge circuit 116. Main contactor 156 enables system shut down should any system element fail.

A chopper circuit fuse 152 is connected between main contactor 156 and chopper circuit 118 to limit excessive current to chopper circuit 118. An H-bridge circuit fuse 154 is connected between main contactor 156 and H-bridge circuit 116 to limit excessive current thereto.

Power regulation through armature winding 144 and field winding 142 is achieved through transistors 119 (in chopper circuit 118) and transistors 120, 122, 124 and 126 (in H-bridge circuit 116). Control of transistors 119, 120, 122, 124 and 126 is achieved through driving circuits 117, 121, 123, 125 and 127, respectively. Motor rotation direction is dictated by the field winding 142 orientation with respect to the armature winding 144. Field winding 142 orientation is controlled by transistor pairs 122, 126 and 120, 124.

The ON-OFF ratio of transistors 119, 120, 122, 124 and 126 results in an average applied terminal voltage to armature winding 144 and field winding 142, respectively. As such, totally independent and fully variable control of armature winding 144 and field winding 142 is achieved.

Polarized snubber circuits 136 and 138 are provided in H-bridge circuit 116 and chopper circuit 118 respectively to:
  a) absorb switching power losses of transistors 119 (in chopper circuit 118), and transistors 120, 122, 124, 126 (in H-bridge circuit 116);
  b) prevent secondary breakdown due to localized heating effects during turn-on and turn-off of transistors; and
  c) prevent spurious turn-on of transistors due to dV/dt.

Free wheeling diodes 128, 129, 130, 132 and 134 provide a path for current upon turn-off of transistors 119, 120, 122, 124 and 126, respectively. Another free wheeling diode is provided across armature 144, also to provide a current path when chopper circuit transistor 119 is turned off.

A dI/dt limiting inductor 137 is provided between H-bridge circuit fuse 154 and H-bridge circuit 116 to restrict the rate of rise of current through the H-bridge circuit 116. This dI/dt limiting inductor 137 protects the H-bridge circuit transistors 120, 122, 124 and 126 from armature voltage spikes. A pair of back to back breakdown diodes 147, 149 and a resistor 145 form a tranzorb 140 across field winding 142 to limit the field voltage.

A regeneration diode 146 connected across transistor 119 provides recirculation of load current back to battery 148 during part of the motor deceleration cycle.

A bypass contactor 150 connected across transistor 119 eliminates the power loss in transistor 119 during sustained high speed travel.

Another aspect of the invention is to provide fail-safe operation. Since the operation of the entire plugging detector system is dependent on knowing when service braking is to occur, two separate switches 110 and 164 are provided on the deadman's pedal. This is very important since mechanical switches can easily fail to be actuated if the plunger becomes contaminated with dirt. Electronic proximity type switches may also be used to improve reliability if they are designed to fail in the off state.

In operation, the vehicle is programmed to perform service braking if either or both deadman switches indicate that the deadman's pedal has been released. Additionally, if the two switches do not agree, an error condition will be flagged and truck operation will be inhibited. This programming causes the system to fail-safe.

Figure 4:
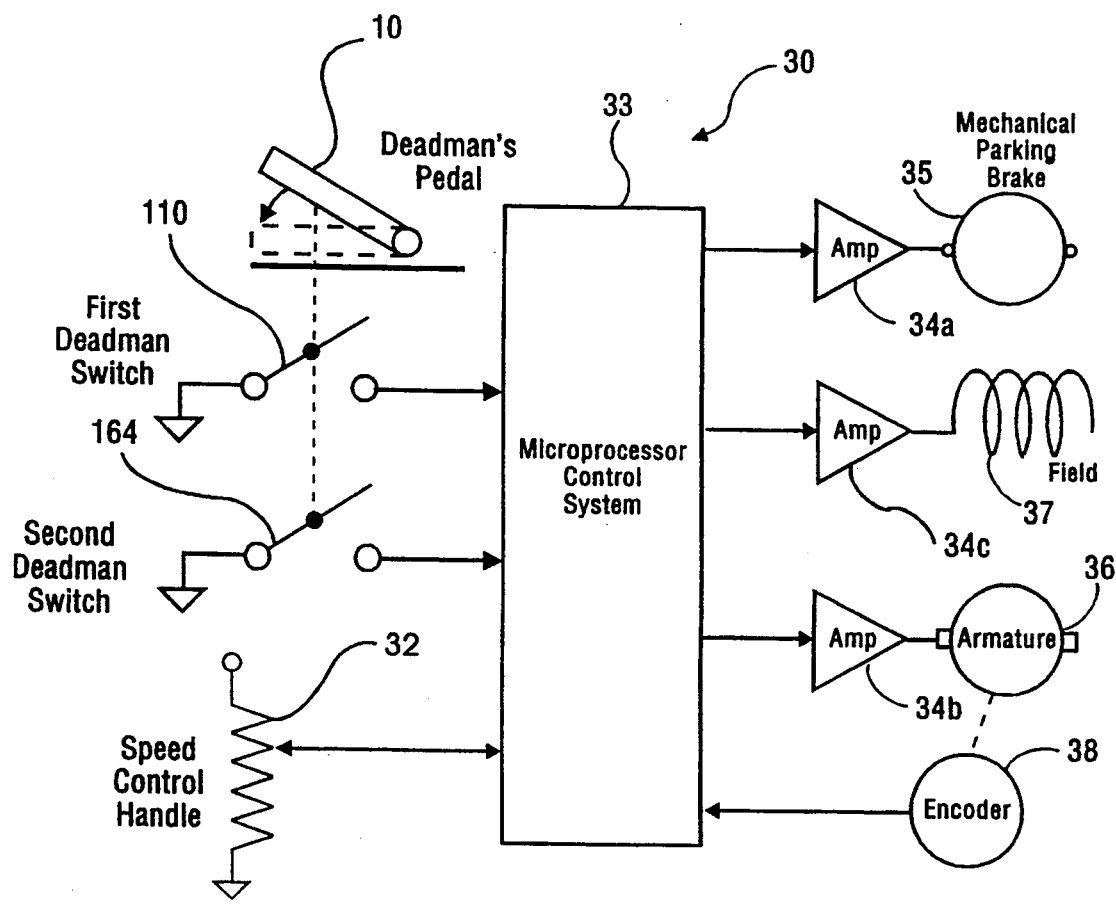
FIG. 4 is a block diagram of the control system of the present invention.

Referring now to FIG. 4, there is shown a block diagram of the control system, referred to generally as reference numeral 30. Two deadman's pedal switches 110 and 164 are mechanically actuated by deadman's pedal 10 with their output signals and that of a speed control handle 32 applied to a microprocessor 33 in which a computer program, described in greater detail hereinbelow, resides. The output of microprocessor 33 is applied to and amplified by power amplifiers 34a, 34b and 34c, respectively, to the vehicle brake 35, the service motor armature 36 and the service motor field winding 37. Connected to service motor armature 36 is an encoder 38 that feeds a signal back to microprocessor 33.

Figure 5:
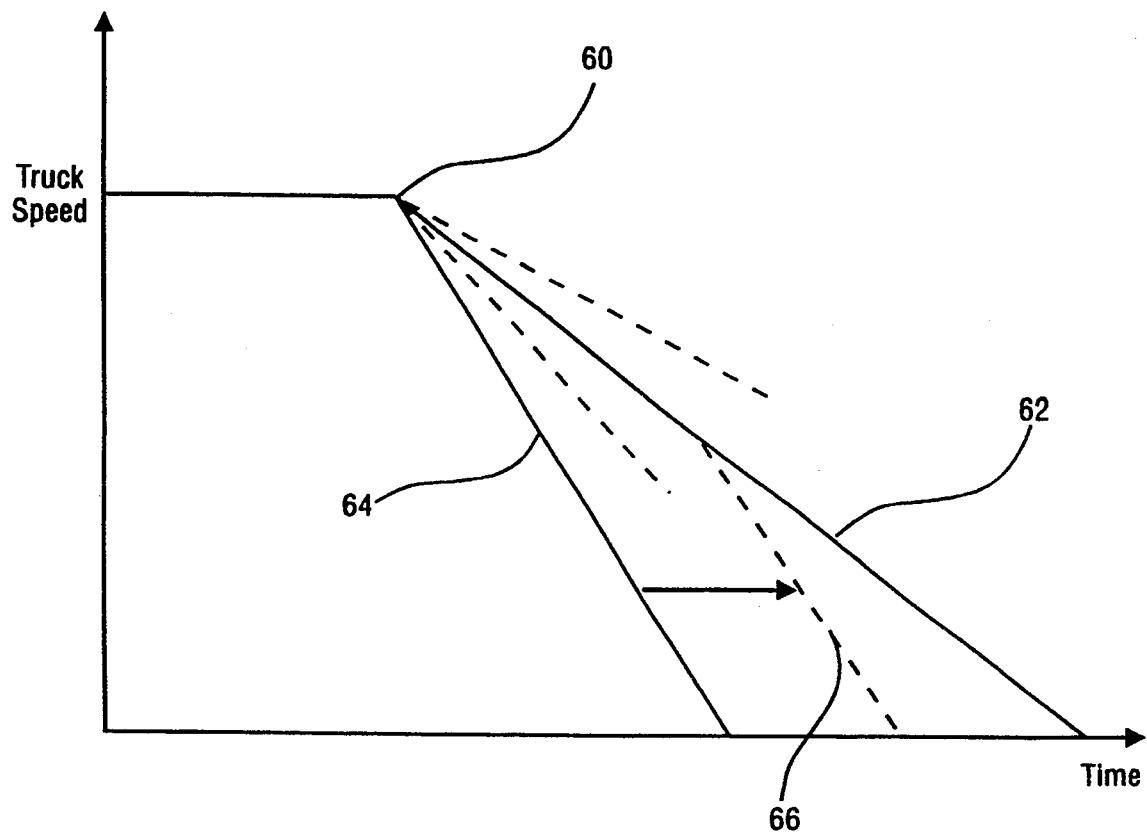
FIG. 5 is a velocity versus time graph of vehicle motion and deceleration.

Referring now to FIG. 5, there is shown a graph depicting the relationship of vehicle velocity versus time. The vehicle may begin to decelerate 60, in accordance with a controlled, programmable routine, at a rate indicated by the slope of the line indicated by reference numeral 62 and described below, or it may decelerate at a higher fixed rate by means of the deadman's switch 110 and/or 164 (FIG. 4), as shown by the slope of the line indicated by reference numeral 64. At any time, if either deadman's switch is released, the deceleration rate transfers between the slope of line 62 to the slope of line 64 as shown by the dotted line 66.

Figure 6:
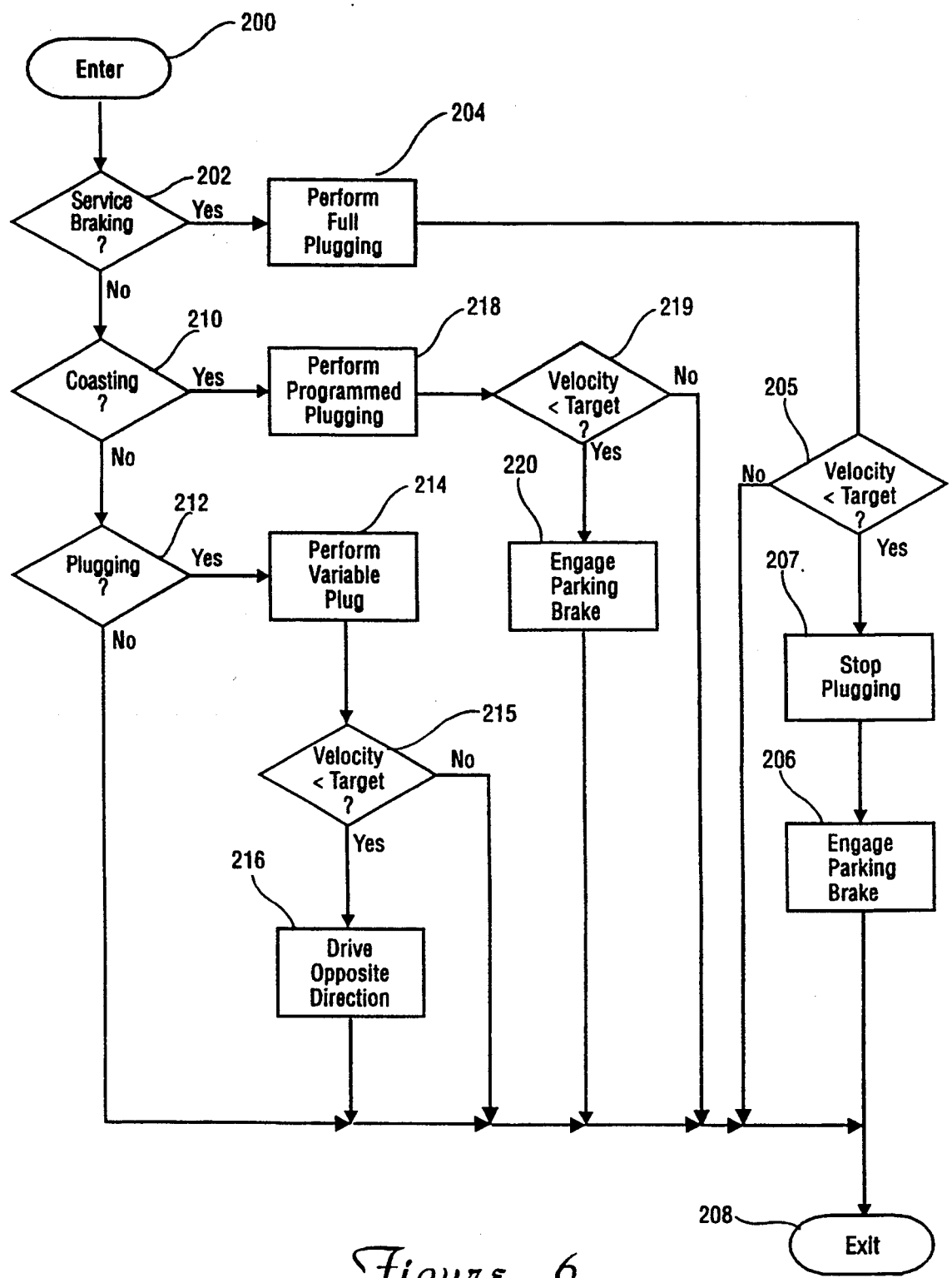
FIG. 6 is a flow chart depicting the process of the present invention.

Referring now to FIG. 6, there is shown a flow chart of the computer program that resides in microprocessor 33 (FIG. 4) and that controls brake 35 and motor 12 in accordance with the invention. The program stored in microprocessor 33 begins at step 200. The system determines whether service braking should be occurring, because the deadman's pedal has been released, step 202, and if so, begins to plug the motor, step 204, detecting when vehicle motion ceases, step 205, using the encoder 38. At that point, plugging is discontinued, step 207, and the parking brake is engaged, step 206. The routine then terminates at step 208. Engaging the brake 35 when the encoder 38 indicates zero speed causes the system to fail-safe if the encoder malfunctions.

If, however, service braking should not be occurring, step 202, the system determines whether the vehicle should be coasting, step 210. If the vehicle is not coasting, the system determines whether a plugging operation should be occurring by the motor, step 212. If so, a variable plug rate is initiated, step 214, and velocity is monitored, step 215, until vehicle motion ceases. At this point, the vehicle direction reverses, step 216, and program execution terminates, step 208.

If, however, the system determines that the vehicle should be coasting, step 210, the motor is plugged at a programmable plug rate, step 218, and the vehicle motion is monitored, using the encoder 38, step 219, until motion ceases. At this point, the system engages the mechanical parking brake, step 220, and program execution terminates, step 208.

Figure 7:
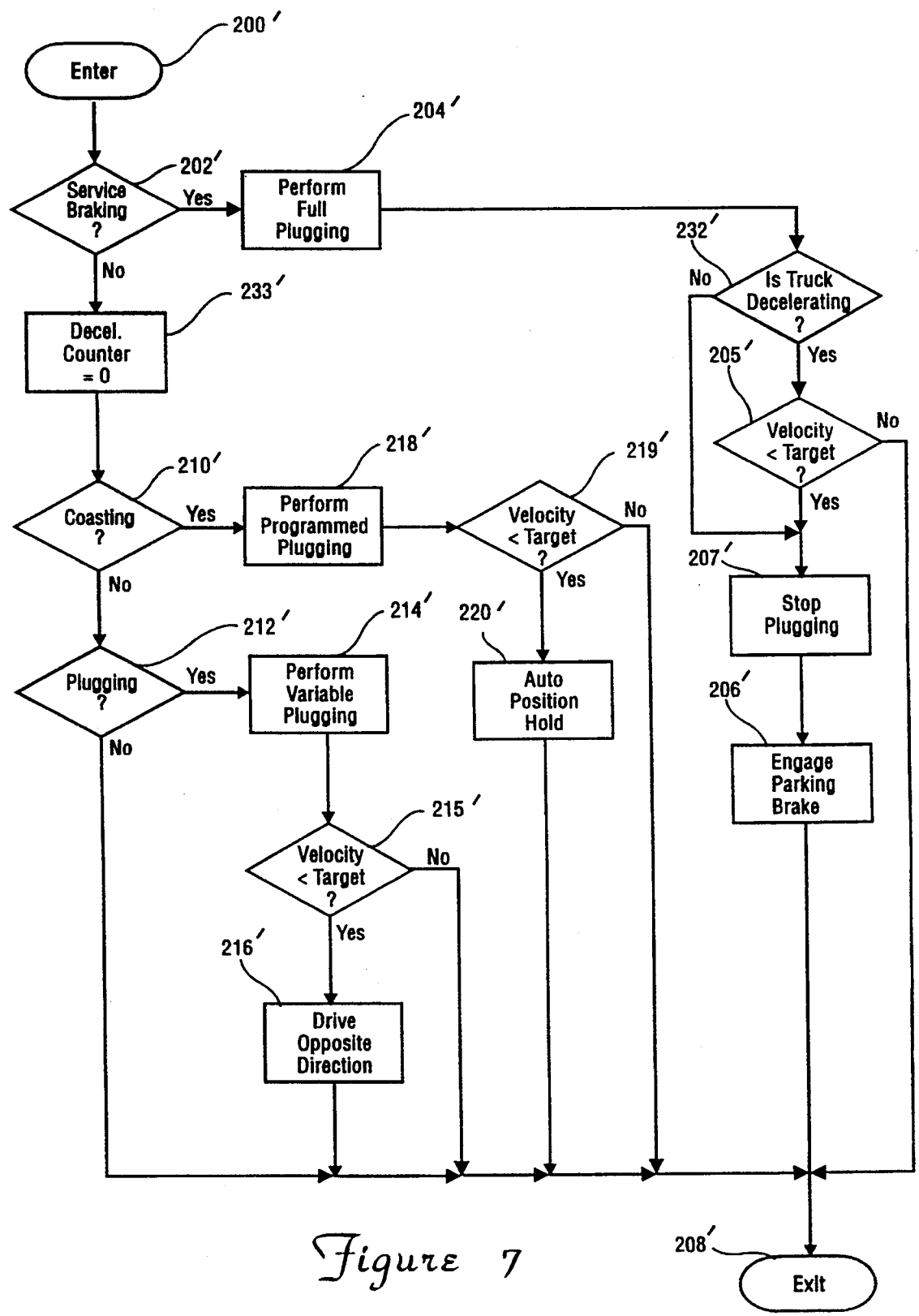
FIG. 7 is a flow chart representation of the deceleration test algorithm.

FIG. 7 is a flow chart representation of the deceleration test algorithm. If service braking is determined, step 202', the vehicle will take the necessary steps to perform a full plug, step 204' and then test if the vehicle is decelerating, step 232. If there is sufficient deceleration, the mechanical parking brake will not be engaged until the vehicle comes to a stop, step 205'. If there is insufficient deceleration, the mechanical parking brake is engaged immediately, step 206'. Step 233 resets a counter called the decel counter, used in decision block 232 to calculate the required timing period. Whenever the deadman's pedal is depressed, the decel counter is held at zero.

Figure 8:
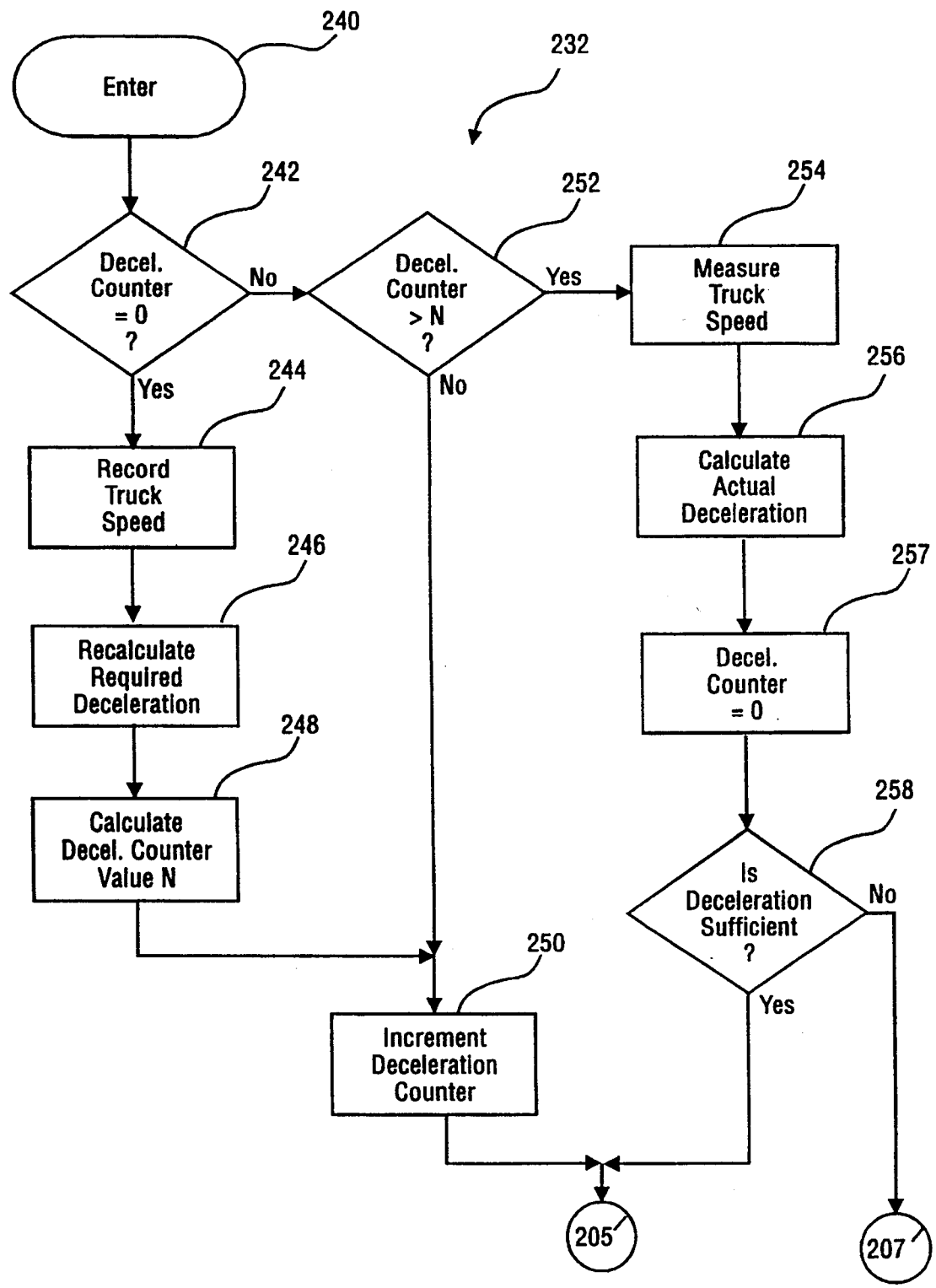
FIG. 8 is a detailed flow chart of a portion of FIG. 7.

The flow chart of FIG. 8 shows the algorithm of step 232 (FIG. 7) in greater detail. As long as the deadman's pedal is depressed, the decel counter is set to zero, step 233 (FIG. 7). When the pedal is first released, the counter is still set to zero, step 242. This causes the truck speed to be recorded, step 244. The amount of deceleration required is then calculated, step 246. The amount of time allowed to decelerate is then calculated, step 248, and the decel counter is incremented, step 250.

Once the decel counter is incremented, step 250, decision block 242 will no longer be true. Each time through the loop the counter is tested, step 252, to see if it is greater than a target value N representing the desired timed delay. If it is not greater than the target, the counter is incremented, step 250, and the loop is exited. Once the target value is exceeded, step 252, the vehicle speed is measured again, step 254, and deceleration is calculated, step 256, as a function of the difference between the new velocity and the original velocity. The magnitude of the deceleration is then tested, step 258, to determine if it is sufficient.

The decel counter is reset, step 257, so that the entire test will repeat until the vehicle comes to a stop. This allows detecting a condition where plugging originally commences but then ceases for some reason.

The amount of deceleration required is calculated, step 246, as a function of truck speed when the deadman's pedal is released. Typically if the speed is greater than or equal to 3.5 mph, the predetermined amount is set to be approximately a 0.7 mph decrease. This set value is used so that a minimum amount of time delay may be used at higher speeds. Similarly, if the speed is less than 3.5 mph, the predetermined amount is a linear derating from 0.7 mph to 0 mph given by:

Required Velocity Decrease=0.7* (Truck Speed@DM/3.5)

This derating verses speed allows for the closest check of service braking performance while allowing for the physical limitations of the vehicle.

The amount of time allowed for deceleration is calculated, step 248, as function of truck speed when the deadman's pedal is released. Step 248 actually calculates the value N required to give the desired time delay. If the speed is greater than or equal to 3.5 mph, the time delay is set to 0.3 seconds. If the speed is less than 3.5 mph, the time delay is set to 0.6 seconds. These settings allow for the fastest response time at higher speeds while taking into account the longer delay time of the truck at slower speeds caused by the need to reverse the traction motor field. The field takes the longest amount of time to reverse when it is being driven at maximum strength. This condition occurs when the vehicle must accelerate quickly from low speeds.

Since the time required to reverse the field is directly related to the amount of current initially flowing in the field, the time delay value can be optimized by calculating it as follows, as a function of initial field current:

$$TIME\ DELAY = K_f(Initial\ Field\ Current) + T_{min}$$

The value of constant $K_f$ is determined by the time constant of the field circuit. The value of $T_{min}$ is a constant based on the maximum time required for the field to build from zero to full plugging.

Figure 9:
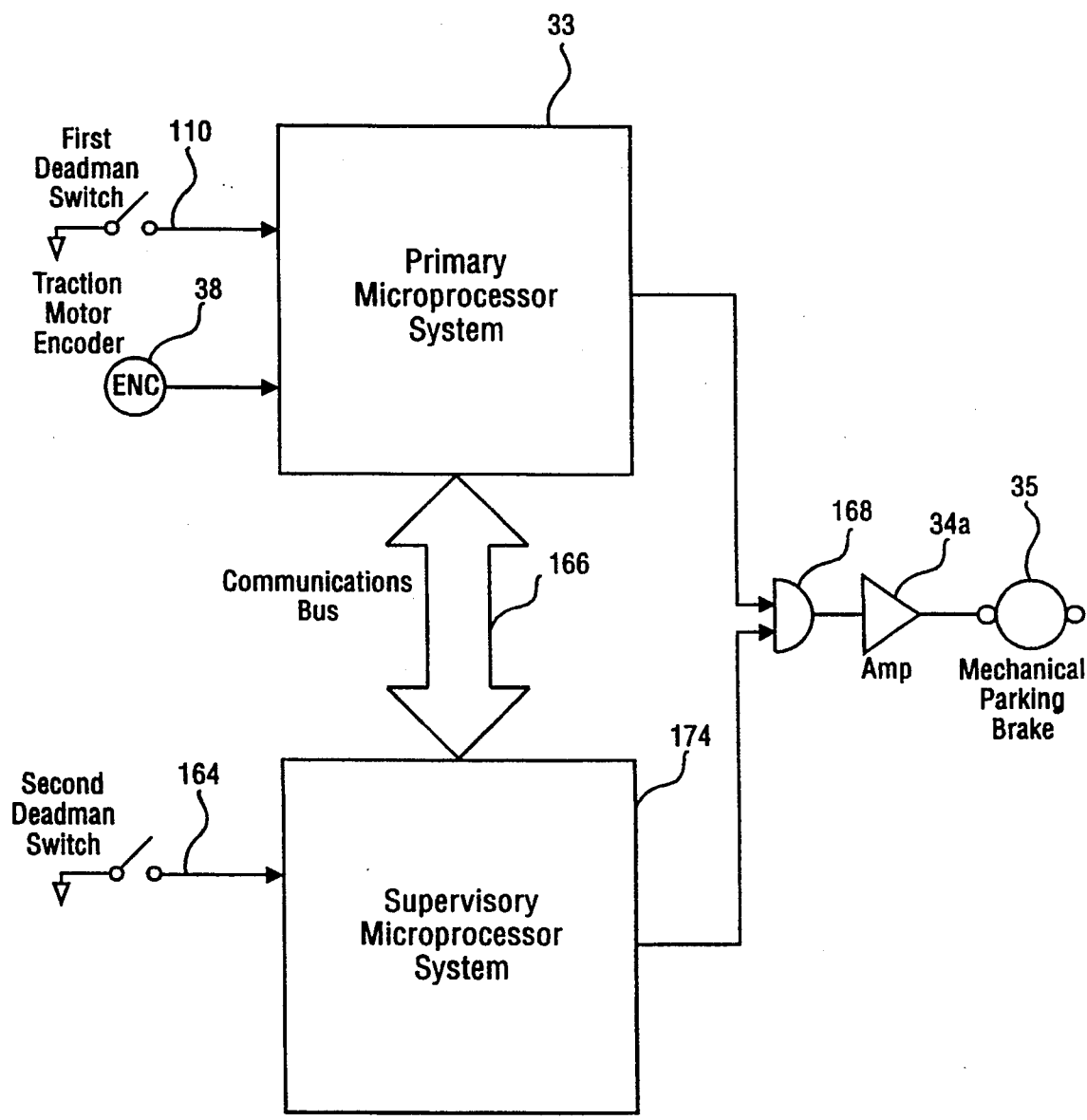
FIG. 9 is a block diagram of a dual microprocessor design including input/output hardware.

Referring to FIG. 9, an enhanced control system providing redundancy is shown. The vehicle is equipped with two separate microprocessors for performing truck functions: the primary microprocessor 33 is responsible for operating the vehicle traction and lift systems, and the supervisory microprocessor 174 is responsible for monitoring the operation of the primary microprocessor 33. The two microprocessors 33 and 174 are connected by a data communications line 166. Both microprocessors 33 and 174 have an input to the parking brake amplifier 34a and mechanical brake 35 through AND gate 168. Thus, either microprocessor 33 or 174 can cause the brake 35 to engage.

The primary microprocessor 33 can read the traction motor encoder 38. From that it determines the speed of the vehicle. It then reports the vehicle speed to the supervisory microprocessor 174 by the data communications line, 166. The supervisory microprocessor 174 records the truck speed at the moment when the deadman's pedal is released, and then rechecks truck speed 0.3 seconds later. If the speed of the truck has not been reduced by a predetermined amount at that time, the supervisory microprocessor 174 will again engage the mechanical brake 35.

one deadman switch 110 has an input to the primary microprocessor 33, and the other switch 164 has an input to the supervisory microprocessor 174. Each microprocessor 33 and 174 reads its respective input. The vehicle is considered to be service braking if either or both switches 110 and 164 indicates that the operator has released the deadman's pedal. If the switches 110 and 164 do not agree, truck operation is prevented or the truck is plugged to a stop.

Another fail-safe aspect of the invention involves the communications buss 166. If the supervisory microprocessor 174 loses communications with the primary microprocessor 33, the supervisory microprocessor 174 will immediately cause the truck mechanical brake 35 to engage through its independent input to the brake.

Figure 10:
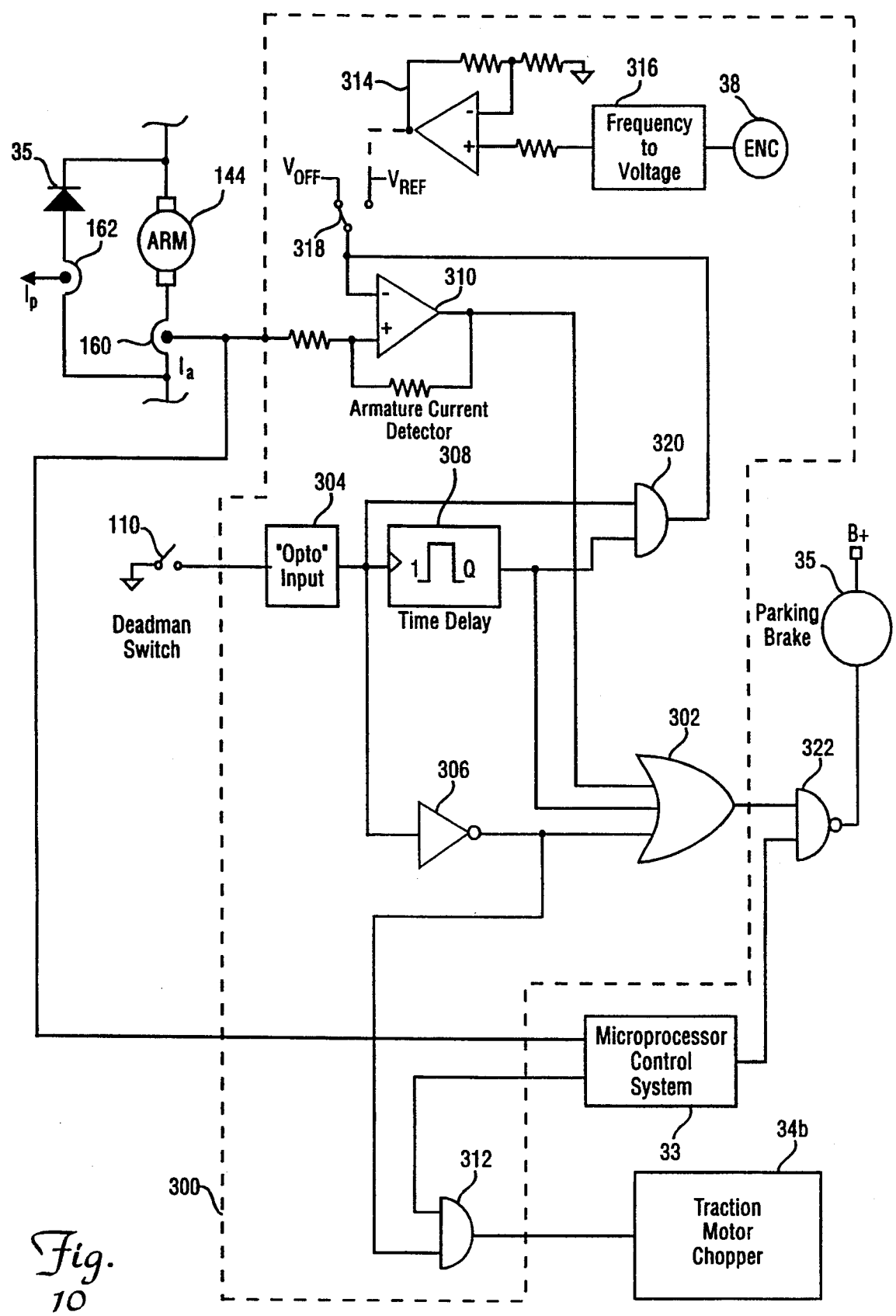
FIG. 10 is a circuit block diagram of the armature current test algorithm as implemented by electronic hardware circuits.

Referring to FIG. 10, an alternate circuit for testing service braking by checking for armature current is shown. The parking brake 35 is controlled by an output NAND gate 322 which allows both the microprocessor control system 33 and the plugging detector hardware circuit 300 to control the parking brake 35. The configuration of this circuit allows either the microprocessor control system 33 or the plugging detector hardware circuits 300 to apply the brake through gate 322. For a dual microprocessor system as previously described, the supervisory microprocessor 174 would have a unique input to NAND gate 322 so that it can cause the brake to engage.

The plugging detector hardware output is the output of the OR gate 302. This gate 302 has three input circuits: a direct connection to the deadman's switch 110 through an opto-isolator circuit 304 and an inverter 306; a time delay circuit 308, which is triggered by the deadman's pedal 110; and an armature current detector 310, which senses armature current in the traction motor 144 using the current sensor 160. The OR gate 302 allows any one of the input circuits to cause the output of the plugging detector to default to a state that will not cause the parking brake to engage. Each one of these inputs will work in turn to keep the brake disengaged as long as the truck is operating properly.

The input circuit connected directly to the deadman's switch is designed to disable all actions by the plugging detector circuit until the deadman's pedal is released. The plugging detector is intended to operate only if the operator steps off of the deadman's pedal. This input is also connected to an AND gate 312 which is used to shut off the traction motor chopper amplifier 346 whenever the deadman's pedal is released. Shutdown of the chopper prevents current from the motor drive system from being interpreted as plugging current.

The input from the time delay circuit 308 is intended to allow time for plugging action to occur before a fault condition is declared. This is necessary because time is required for field current to reach levels high enough to cause the motor to perform as a generator, especially if the field must reverse from a driving condition.

The input from the armature current detector 310 is intended to hold off brake engagement as long as the motor is acting as a generator. This detector is essentially an analog comparator circuit which compares an analog voltage from the armature current detector 160 to a voltage representing the amount of current required to conclude that plugging is occurring. The output of the comparator becomes a digital HIGH or LOW signal depending on which input signal is larger.

Included in the design of the comparator is an enable/disable switch 318, controlled by AND gate 320, which permits the detector to be shut off. The enable/disable switch 318 connects the inverting terminal of the comparator circuit to either a reference voltage $V_{REF}$ or to a voltage $V_{OFF}$. The reference voltage $V_{REF}$ represents the required output of the current sensor 160 to determine that generator action is occurring. The voltage $V_{OFF}$ represents a current that is beyond the measurement capability of the current sensor due to saturation of the amplifier within the current sensor. This means that when $V_{OFF}$ is applied to the comparator, the output of the current sensor cannot exceed its value and make the output of circuit 310 go HIGH. The output of the comparator will then always be LOW indicating no current in the armature.

The detector 310 is shut off whenever the deadman's pedal 110 is depressed and during the time delay period caused by circuit 308 through gate 320. This allows time for the current from the traction motor chopper to die out and/or for the motor to begin generator action before the detector tests for current. Disabling of the detector also prevents detecting of driving current as plugging current and allows setting the detector to any desired level.

In operation, the plugging detector output is initially held off anytime the deadman's pedal is depressed. When the pedal is released, the time delay circuit is triggered and its output prevents the brake from being engaged. At the end of the time delay period, the armature current detector is enabled. If sufficient current is flowing in the armature circuit, the output of the armature current detector turns on and prevents the brake from engaging.

The inverting terminal of the comparator 310 is connected to a reference voltage $V_{REF}$ by switch 318 as previously described. This reference voltage may be either a fixed value or it may be a variable value that increases as truck speed increases. Use of a variable voltage permits a more rigorous test of the armature current because the magnitude of armature current produced is directly proportional to the speed of the motor. A simple method of generating this variable voltage is to connect the signal from the traction motor encoder 38 to a frequency-to-voltage converter 316 to produce an analog voltage, then to scale and voltage shift this voltage as required with an amplifier 314.

The armature current sensor 160 is the same sensor used by the microprocessor control system 33 to run the traction control system. The operation of this sensor is critical to the proper operation of the plugging detector circuits. It is advantageous to use the same sensor for both systems because the microprocessor control system can be used to check the operation of the sensor during normal operation. This reduces the chances that the plugging detector circuits will fail to operate if a fault occurs. Improper operation of the sensor can be used to disable operation of the vehicle. The most important consideration in checking the operation of the current sensor is to ensure that its output goes to zero when no current is flowing in the armature. A failure mode where the sensor indicates current flow constantly would defeat the operation of the armature current test. This can easily be checked for by the microprocessor control system 33 during normal operation.

Another possible implementation of this same scheme would be to use a separate current sensor 162 in the freewheeling diode loop (FIG. 10) in place of current sensor 160. This has the advantage of providing a better indication of plugging current because less current flows in this loop during driving mode. This has the disadvantages of requiring a separate sensor with its added cost and complexity, and it is not part of the main microprocessor control system 33. Its output would have to be brought into this control system in order to provide the cross-checking advantages previously described. Its output could not be adequately tested by a separate plugging detector system unless it was known when the truck was actually being plugged.

Figure 11:
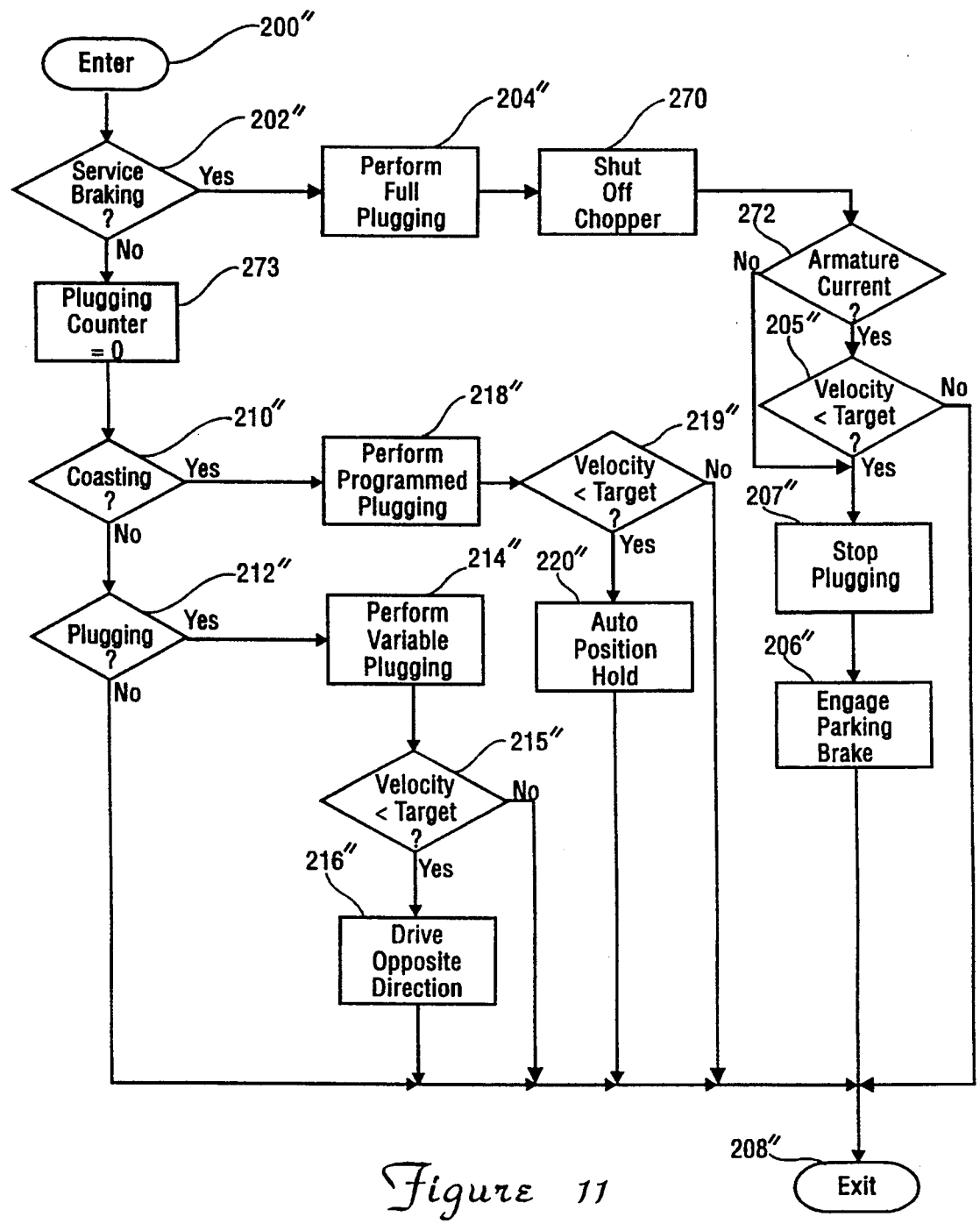
FIG. 11 is a flow chart representation of the armature current test algorithm as implemented by a microprocessor.

The operation of the armature current test can also be explained in terms of flow charts as shown in FIG. 11. If service braking is determined, step 202", the vehicle will take the necessary steps to perform a full plug, step 204", shutting off the traction motor chopper, step 270, and then testing for armature current, step 272. If sufficient armature current is present, the mechanical parking brake will not be engaged until the vehicle comes to a stop, step 205". If insufficient armature current is present, the mechanical parking brake is engaged immediately, step 206". The test for armature current, step 272, is described in detail hereinbelow.

Step 270 is used to shut off the traction motor chopper because the chopper can cause current to flow in the armature if it is on. This current could then be incorrectly be interpreted as current due to plugging and the test would fail to perform its intended task. A plugging counter is reset, step 273, and is used as part of decision block 272. Whenever the deadman's pedal is depressed, this plugging counter is held at zero.

Figure 12:
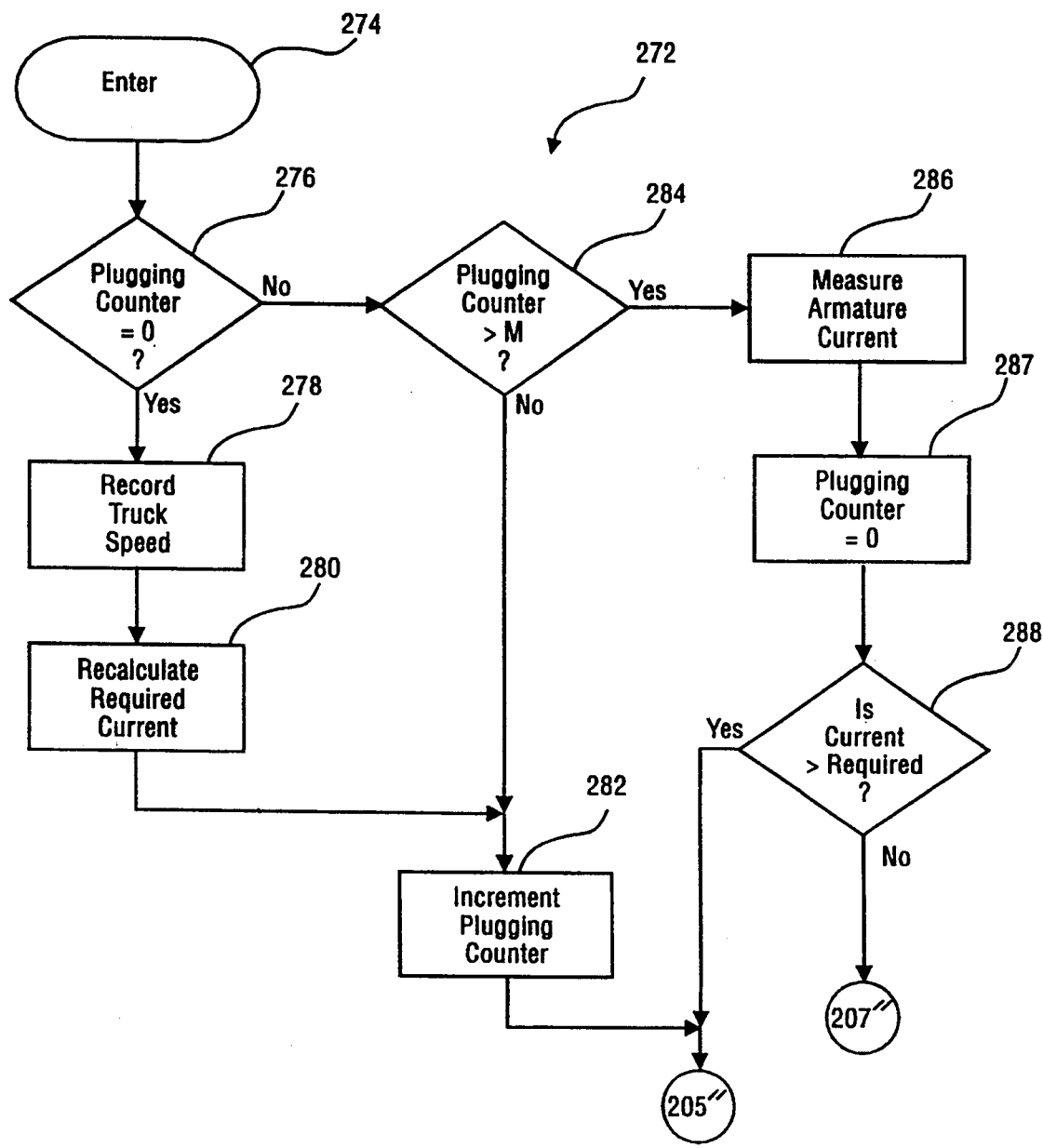
FIG. 12 is a detailed flow chart of a portion of FIG. 11.

The flow chart of FIG. 12 describes the algorithm of step 272 (FIG. 11). As long as the deadman's pedal is depressed, the plugging counter is set to zero, step 273 (FIG. 11). When the pedal is first released, the counter is still set to zero, step 276. This causes the truck speed to be recorded, step 278, the amount of armature current required to be calculated, step 280, and the plugging counter to be incremented, step 282. The calculation of required armature current can be either a simple straight line formula that increases with truck speed, or a constant, as previously explained.

Once the plugging counter is incremented, step 282, decision block 276 if false and control is transferred to test the counter, step 284, to see if it is greater than a target value M, representing the desired timed delay. If it is not greater than the target, the counter is incremented and the loop is exited. Once the target value is exceeded, the armature current is measured, step 286, and the magnitude of the current is tested, step 288, to determine if it is sufficient.

The plugging counter is reset, step 287, so that the entire test will repeat until the vehicle comes to a stop. This allows for detecting a condition where plugging originally commences but then ceases for some reason.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A process for slowing and stopping a vehicle having an electric service motor, a mechanical parking brake, and a deadman's switch, comprising the steps of:
   a) determining whether said deadman's switch is engaged;
   b) when said deadman's switch is disengaged, plugging said electric service motor at a predetermined plug rate;
   c) monitoring deceleration and speed of said vehicle and comparing the rate of vehicle deceleration and the vehicle speed, respectively, with a predetermined deceleration rate and a predetermined vehicle speed;
   d) ceasing said plugging when said rate of vehicle deceleration is less than said predetermined deceleration rate or when said vehicle speed is less than said predetermined vehicle speed; and
   e) engaging said mechanical brake causing said vehicle to come to a stop.

2. The process for slowing and stopping a vehicle in accordance with claim 1, further comprising the step of:
   f) ceasing said plugging in accordance with step (b) at any time it is determined that said deadman's switch is engaged in accordance with step (a).

3. The process for slowing and stopping a vehicle in accordance with claim 1, further comprising the step of:
   f) determining deceleration in accordance with step (c) using a first reading of the vehicle speed at a first predetermined time and using a second reading of the vehicle speed at a second predetermined time.

4. The process for slowing and stopping a vehicle in accordance with claim 3, wherein the time interval between said first and second vehicle speed readings is determined based on said first vehicle speed reading.

5. The process for slowing and stopping a vehicle in accordance with claim 4, wherein said first vehicle speed reading is taken when said deadman's switch is disengaged.

6. The process for slowing and stopping a vehicle in accordance with claim 3, wherein the time interval between said first and second vehicle speed readings is determined based on the initial field current of said electric service motor.

7. The process for slowing and stopping a vehicle in accordance with claim 1, wherein said deceleration and speed monitoring step (c) is performed continuously.

8. Apparatus for slowing and stopping a material handling vehicle having an electric service motor and a mechanical parking brake, comprising:
   a) processing means for controlling a plugging rate of the electric service motor of a material handling vehicle in order to decelerate said vehicle at a predetermined deceleration rate, said processing means being operatively connected to the mechanical parking brake of said vehicle;
   b) monitoring means, operatively connected to said processing means, for monitoring the actual armature current of said electric service motor and for monitoring the speed of said material handling vehicle; and
   c) deadman's switching means, operatively connected to said processing means, for applying a request thereto, whereby said mechanical parking brake is actuated in response to said deadman's switching means request to decelerate said vehicle at a rate of deceleration greater than said predetermined deceleration rate or whereby said mechanical parking brake is actuated when said actual armature current is less than a predetermined value thereof.

9. The apparatus for slowing and stopping a material handling vehicle in accordance with claim 8, wherein said deadman's switching means comprises at least two deadman's switches.

10. The apparatus for slowing and stopping a material handling vehicle in accordance with claim 9, wherein said material handling vehicle is brought to a stop if either or all of said deadman's switches is disengaged.

11. The apparatus for slowing and stopping a material handling vehicle in accordance with claim 9, wherein vehicle operation is disabled and an error condition flag is set when the deadman's switches indicate disparate settings thereof.

12. The apparatus for slowing and stopping a material handling vehicle in accordance with claim 9, wherein said processing means comprises at least two processors, a first of said processors being operatively connected to a first of said deadman's switches and a second of said processors being operatively connected to a second of said deadman's switches, said two processors being operatively connected to one another so that when either of said deadman's switches applies a request to its respective processor, said mechanical parking brake is actuated in response thereto.

13. The apparatus for slowing and stopping a material handling vehicle in accordance with claim 8, wherein said mechanical parking brake is engaged when said monitoring means indicates zero speed of said material handling vehicle.

14. A process for plugging an electric service motor of a material handling vehicle for slowing said material handling vehicle to an efficient stop, said material handling vehicle having a mechanical brake and said electric service motor having an armature, the process comprising the steps of:
   a) plugging said electric service motor of a material handling vehicle at a predetermined plug rate to slow said vehicle;
   b) monitoring deceleration of said vehicle, speed of said vehicle, and armature current of said electric motor during plugging and comparing actual deceleration to a predetermined rate of deceleration, comparing actual speed to a predetermined speed, and comparing actual armature current to a predetermined current value, respectively;
   c) ceasing said plugging operation when said actual armature current is less than said predetermined current value, or when said actual speed is less than said predetermined speed, or when said actual deceleration is less than said predetermined rate of deceleration; and d) engaging said mechanical brake of said material handling vehicle to cause said vehicle to come to a stop.

15. The process for plugging an electric service motor of a material handling vehicle in accordance with claim 14, further comprising the step of:
   e) determining whether a deadman's switch of said material handling vehicle is disengaged prior to said plugging step.

16. The process for plugging an electric service motor of a material handling vehicle in accordance with claim 14, further comprising the step of:
   e) ceasing said plugging at any time it is determined that a deadman's switch of said material handling vehicle is engaged.

17. The process for plugging an electric service motor of a material handling vehicle in accordance with claim 14, further comprising the step of:
   e) disabling an armature current amplifier during service braking.

18. The process for plugging an electric service motor of a material handling vehicle in accordance with claim 15, wherein said current value varies as a function of material handling vehicle speed when said deadman's switch is disengaged.

19. The process for plugging an electric service motor of a material handling vehicle in accordance with claim 14, further comprising the step of:
   e) ceasing armature current comparison when said deadman's switch is engaged.

20. The process for plugging an electric service motor of a material handling vehicle in accordance with claim 19, further comprising the step of:
   f) resuming comparison of said armature current after a predetermined time from disengagement of said deadman's switch.

21. A process for slowing and stopping a vehicle having an electric service motor, a mechanical parking brake, and a deadman's switch, comprising the steps of:
   a) determining whether said deadman's switch is engaged;
   b) when said deadman's switch is disengaged, plugging said electric service motor at a predetermined plug rate;
   c) monitoring the rate of deceleration of said vehicle and armature current of said electric service motor, and comparing said rate of vehicle deceleration and said armature current, respectively, with a predetermined deceleration rate and predetermined armature current;
   d) ceasing said plugging when said rate of vehicle deceleration is less than said predetermined deceleration rate or when said armature current is less than said predetermined armature current; and
   e) engaging said mechanical brake causing said vehicle to come to a stop.

22. The process for slowing and stopping a vehicle in accordance with claim 21, further comprising the step of:
   f) ceasing said plugging in accordance with step (b) at any time it is determined that said deadman's switch is engaged in accordance with step (a).

23. The process for slowing and stopping a vehicle in accordance with claim 21, further comprising the step of:
   f) determining said rate of deceleration in accordance with step (c) using a first reading of the vehicle speed at a first predetermined time and using a second reading of the vehicle speed at a second predetermined time.

24. The process for slowing and stopping a vehicle in accordance with claim 23, wherein the time interval between said first and second vehicle speed readings is determined based on said first vehicle speed reading.

25. The process for slowing and stopping a vehicle in accordance with claim 24, wherein said first vehicle speed reading is taken when said deadman's switch is disengaged.

26. The process for slowing and stopping a vehicle in accordance with claim 23, wherein the time interval between said first and second vehicle speed readings is determined based on the initial field current of said electric service motor.

27. The process for slowing and stopping a vehicle in accordance with claim 21, wherein said rate of deceleration and armature current monitoring step (c) is performed continuously.

* * * * *